United States Patent
Kawauchi

(10) Patent No.: US 7,437,932 B2
(45) Date of Patent: Oct. 21, 2008

(54) GYRO VIBRATION PIECE AND GYRO SENSOR

(75) Inventor: Osamu Kawauchi, Shiojiri (JP)

(73) Assignee: Seiko Epson Corporation (JP)

( * ) Notice: Subject to any disclaimer, the term of this patent is extended or adjusted under 35 U.S.C. 154(b) by 91 days.

(21) Appl. No.: 11/392,843

(22) Filed: Mar. 29, 2006

(65) Prior Publication Data

US 2006/0219007 A1    Oct. 5, 2006

(30) Foreign Application Priority Data

Mar. 30, 2005    (JP)    ............................. 2005-097590

(51) Int. Cl.
*G01P 9/04*    (2006.01)

(52) U.S. Cl. .................................................. 73/504.12

(58) Field of Classification Search .............. 73/504.12, 73/504.15, 504.16; 310/329, 370; 301/329, 301/270
See application file for complete search history.

(56) References Cited

U.S. PATENT DOCUMENTS

| 5,998,233 | A | 12/1999 | Sugitani et al. |
| 6,389,897 | B1 * | 5/2002 | Tani et al. ................ 73/504.12 |
| 7,167,061 | B2 * | 1/2007 | Matsudo et al. ............. 331/156 |
| 2005/0284223 | A1 | 12/2005 | Karaki et al. |

FOREIGN PATENT DOCUMENTS

| JP | 10-41772 | 2/1998 |
| JP | 10-96632 | 4/1998 |
| JP | 2001-012952 | 1/2001 |
| JP | 2005-62160 | 3/2005 |

* cited by examiner

*Primary Examiner*—John E Chapman
(74) *Attorney, Agent, or Firm*—Harness, Dickey & Pierce, P.L.C.

(57) ABSTRACT

A gyro vibration piece detecting an angular velocity includes a supporting part, a driving part connected to the supporting part and performing vibration, and a detection part detecting vibration generated by Coriolis force generated by the rotation of the driving part. A connection part includes a connection portion having a fin and an end portion connected between at least one of a side of the driving part and a side of the supporting part and a side of the detection part and a side of the supporting part. The end portion includes a top surface and a side surface, whereby the side surface is substantially perpendicular to the top surface and includes a circular arc shape disposed along a bottom portion thereof opposite to a junction of the top surface and the side surface.

4 Claims, 6 Drawing Sheets

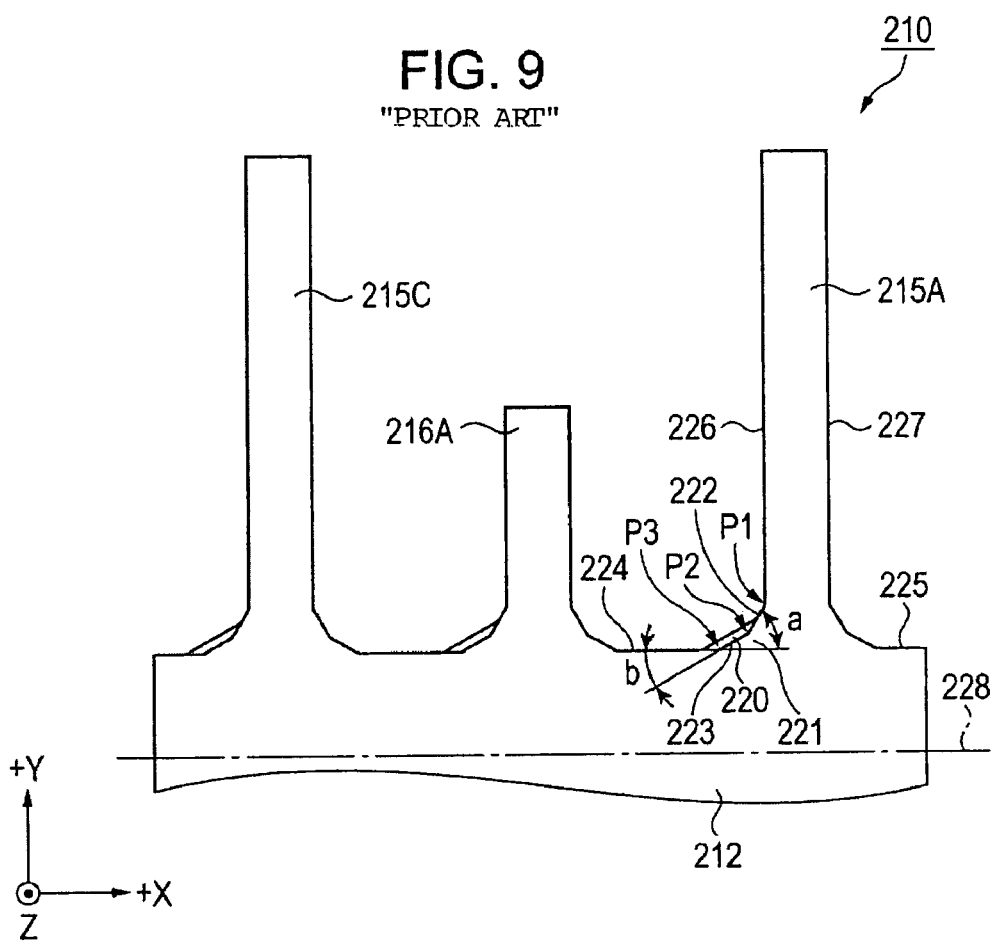
FIG. 9
"PRIOR ART"
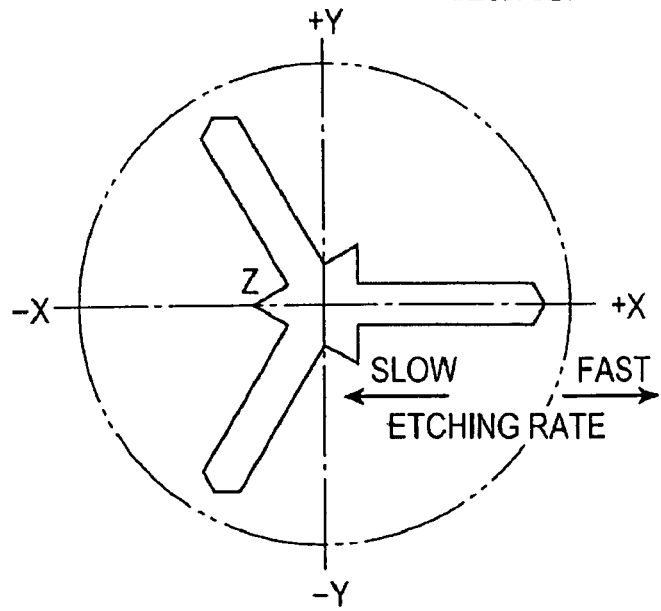
FIG. 10 "PRIOR ART"

GYRO VIBRATION PIECE AND GYRO SENSOR

BACKGROUND

1. Technical Field

The present invention relates to a gyro vibration piece used in a gyro sensor detecting rotational angular velocity, and to a method of manufacturing the gyro vibration piece.

2. Related Art

A gyro vibration piece according to the related art will be described with reference to FIG. 9. FIG. 9 illustrates an example of a gyro vibration piece, and is a partial plan view of a gyro vibration piece using a crystal. As shown in FIG. 9, a gyro vibration piece 210 includes driving parts 215A and 215C, and a detection part 216A located at a central portion thereof. The driving parts 215A and 215C and the detection part 216A are connected through individual connection parts 221 to a supporting part 212 in an X-Y plane which is a crystalline direction of a crystal. The connection part 221 of the driving parts 215A and 215C is formed in the same manner as the connection part 221 of the detection part 216A, and the connection part 221 of the driving part 215A will thus be described herein. The driving parts 215A and 215C and the detection part 216A are formed in line symmetry with respect to an axis 228 located at a central portion of the supporting part 212 along the X-axis. That is, even though not shown in FIG. 9, a pair of the driving part 215A, a pair of the driving part 215C, and a pair of the detection part 216A are formed with respect to the axis 228. The gyro vibration piece 210 is formed by chemical etching by photolithography. An external shape, an electrode or the like is formed by the chemical etching.

Next, a chemical etching rate will be described. FIG. 10 is a polar coordinate diagram showing the etching rate of a Z-cut crystal substrate in an X-Y plane. Referring to FIG. 10, the etching rate is zero at the center of a circle. In addition, the etching rate becomes higher as it becomes more distant from the center of the circle. It can be understood that the Z-cut crystal has anisotropy in the etching. Particularly, in-plane etching rate become higher in +X direction, +120° direction and −120° direction with respect to the X-axis, while in-plane etching rate become lower in −X direction, +30° direction and −30° direction with respect to the X-axis. On the other hand, the etching rate of Z direction becomes higher in −X direction, +30° direction and −30° direction with respect to the X-axis, while the etching rate of Z direction becomes lower in +X direction, +120° direction and −120° direction with respect to the X-axis.

Due to the anisotropy in the etching, a protrusion-shaped fin 220 is formed on a side of the connection part 221 between the driving parts 215A and 21C and the detection part 212.

Since the fin 220 varies in size depending on the direction of the connection part 221, the driving parts 215A and 215C and the detection part 216A have an asymmetrical shape in width direction, causing the vibration performance of the gyro vibration piece 210 to be deteriorated. Examples of deterioration of the vibration performance of the gyro vibration piece include unstable vibration amplitude due to poor balance of vibration, unnecessary vibration, and the like. Thus, a processing method having a long etching time is employed in order to make the fin as small as possible. As the etching time becomes long, the connection part 221 between the driving parts 215A and 215C and the detection part 216A and the supporting part 212 has a lateral shape formed such that a segment 222 having an angle of +60° (angle 'a') and a segment 223 having an angle of 30° (angle 'b') are continuously connected to each other. That is, the two segments 222 and 223 are connected to each other by performing an etching process for a long time.

The shape will be described in detail with reference to the driving part. A segment 226 of the driving part 215A and a segment 224 of the supporting part 212 are connected to each other through a segment 222 forming an angle of +60° (angle 'a') with respect to X-axis and a segment 223 forming an angle of 30° (angle 'b') with respect to X-axis. In addition, a segment 227 of the driving part 215A is connected to a segment of the supporting part 212 in line symmetry to the connection. In addition, a fin 220 is formed almost at a central portion of a thickness direction (Z-axis direction) on the side of the segment 226 of the driving part 215A. Similarly to the driving part 215A, the driving part 215C and the detection part 216A are connected to the supporting part 212 (for example, JP-A-10-96632).

However, in the above-mentioned gyro vibration piece, the segment 226 of the driving part 215A and the segment 224 of the supporting part 212 are connected to each other through the segment 222 forming an angle of +60° (angle 'a') with respect to X-axis and the segment 223 forming an angle of 30° (angle 'b') with respect to X-axis. In this case, vertices P1, P2, and P3 are formed on portions in which the segments 226, 222, 223, and 224 intersect each other. For example, when an impact, such as dropping, is applied to the gyro vibration piece, stress concentration due to the impact occurs one of the vertices P1, P2, and P3. Due to the stress concentration, the driving parts 215A and 215C, or the detection part 216A may be broken.

SUMMARY

An advantage of some aspects of the invention is that it provides a gyro vibration piece that prevents breakdown of a driving part or a detection part due to an impact, such as dropping, applied from the outside of the gyro vibration piece and has an improved impact resistance.

According to an aspect of the present invention, there is provided a gyro vibration piece detecting an angular velocity, including: a supporting part; a driving part connected to the supporting part and performing vibration; a detection part connected through the driving part and the supporting part and detecting detection vibration generated by Coriolis force generated by the rotation of the driving part; and a connection part including a connection portion having a plurality of steps formed between a side of a width direction of the driving part or a side of a width direction of the detection part and a side of another portion connected to the driving part or the detection part, which are continuously connected, in which the connection part has a first end portion which is located on an innermost side of the connection part among the connection portion and has a circular arc shaped wall portion that connects a side of a width direction of the driving part or a side of a width direction of the detection part to a side of another portion connected to the driving part or the detection part, and a bottom surface having a predetermined depth.

In the gyro vibration piece, the driving part or the detection part is connected to another part through a connection part including the first end portion having a circular arc shaped wall portion formed on the innermost side of the connection part. Since the circular arc shaped wall portion of the first end portion does not have vertices, stress concentration due to an external impact seldom occurs. Accordingly, it is possible to prevent breakdown due to the stress concentration. In addition, since the first end portion has a bottom surface and the central portion has a wall portion on the outside than the first end portion, it is possible to increase the sectional area. That is, it is possible to improve the intensity of the connection part by increasing the volume of the connection part. As a result, it is possible to provide a gyro vibration piece that prevents breakdown of a driving part or a detection part due to an impact, such as dropping, applied from the outside of the gyro vibration piece and has an improved impact resistance.

Preferably, the supporting part includes a base part and a supporting member extended from the base part, the driving part is connected to the supporting member, and the detection part is extended from the base part.

The gyro vibration piece may include a second connection part having a second connection portion having a plurality of steps formed between a side of the base part and a side of the supporting member, which are continuously connected, in which the second connection part has a second end portion which is located on an innermost side of the second connection part among the second connection portion and has a circular arc shaped wall portion that connects a side of the base part to a side of the supporting member, and a bottom surface having a predetermined depth.

Accordingly, since the circular arc shaped wall portion of the second end portion does not have vertices, stress concentration due to an external impact seldom occurs. Accordingly, it is possible to prevent breakdown due to the stress concentration. In addition, since the second end portion has a bottom surface and the central portion has a wall portion on the outside than the second end portion, it is possible to increase the sectional area. That is, it is possible to improve the intensity of the second connection part by increasing the volume of the second connection part. As a result, it is possible to provide a gyro vibration piece that prevents breakdown of a driving part or a detection part due to an impact, such as dropping, applied from the outside of the gyro vibration piece and has an improved impact resistance.

Preferably, at least one connection portion having the plurality of steps has a fin part projected on the outside of a central portion of a thickness direction of the connection portion, and a third end portion that is continuously connected to the fin part and has a wall portion on an inner side of the connection part than the fin part, and the first or second end portion is formed on an inner side of the connection part than the wall portion of the third end portion.

Accordingly, since the first or second end portion is formed on an inner side than the fin part and the third end portion, the wall portion continuously connected to the driving part, the detection part, or the surface of the supporting member roughly has a circular arc shape without vertices. Accordingly, stress concentration due to an external impact seldom occurs, thereby preventing breakdown due to the stress concentration.

According to another aspect of the present invention, there is provided a method of manufacturing a gyro vibration piece including a supporting part; a driving part connected to the supporting part and performing vibration; a detection part connected through the driving part and the supporting part and detecting detection vibration generated by Coriolis force generated by the rotation of the driving part; and a connection part including a connection portion having a plurality of steps formed between a side of a width direction of the driving part or a side of a width direction of the detection part and a side of another portion connected to the driving part or the detection part, which are continuously connected, the method including: forming a first mask on a surface of a piezoelectric substrate; forming a first external shape by performing a first etching process to remove the piezoelectric substrate on an opening of the first mask; forming a second mask on a surface of the first external shape; and forming a second external shape, in which part of the first external shape is removed, by performing a second etching process to remove the piezoelectric substrate on an opening of the second mask, in which, in the step of forming a second external shape, a first end portion, which has a circular arc shaped wall portion that connects a side of a width direction of the driving part or a side of a width direction of the detection part to a side of another portion connected to the driving part or the detection part, and a bottom surface having a predetermined depth, is formed on an inner side than a wall portion formed on the innermost side among the connection portion formed by the process of forming the first external shape.

According to the method of manufacturing the gyro vibration piece, the first end portion is formed by performing the second etching process on the inner side than the wall portion formed on the innermost side of the connection portion formed by the first etching process. The first end portion has a circular arc shaped wall portion on the inner side than the wall portion formed on the innermost side of the connection portion formed by the process of forming the first external shape. Accordingly, the wall portion having vertices formed by the first etching process is removed, and vertices are not formed on a portion close to the surface, such that stress concentration due to an external impact seldom occurs. Accordingly, it is possible to prevent breakdown due to the stress concentration.

Preferably, the second etching process is performed in a shorter process time than the first etching process.

Since the second etching process is performed in a shorter time than the first etching process, an uneven shape is seldom generated. Thus, the end portion formed by the second etching process does not have uneven shape very much, such that the connection part has a stable shape. Accordingly, it is possible to prevent problems generated due to the uneven planar shape of the connection part. For example, it is possible to prevent the vibration of the driving part from leaking to the outside such as the detection part, or to reliably detect the angular velocity.

According to another aspect of the present invention, there is provided a gyro sensor including: a holding unit; and a gyro vibration piece according to the first aspect that is mounted in the holding unit.

In the gyro sensor, the gyro vibration piece is mounted in the holding unit. Accordingly, it is possible to provide a one-package-type gyro sensor having an excellent impact resistance.

According to another aspect of the present invention, there is provided a gyro sensor including: a holding unit; a gyro vibration piece that is mounted in the holding unit; and a circuit element mounted in the holding unit and having at least a function of driving the gyro vibration piece.

The gyro sensor includes the gyro vibration piece and a mounted circuit element having at least a function of driving the gyro vibration piece in the holding unit. Accordingly, it is possible to provide a small-sized one-package-type gyro sensor which has an excellent impact resistance and in which oscillation and drive can be performed by one gyro sensor.

BRIEF DESCRIPTION OF THE DRAWINGS

The invention will be described with reference to the accompanying drawings, wherein like numbers reference like elements.

FIG. 9 is a partial plan view of a gyro vibration piece according to the related art.

FIG. 10 is a polar coordinate diagram showing the etching rate of a Z-cut crystal substrate in an X-Y plane.

DESCRIPTION OF EXEMPLARY EMBODIMENTS

Preferred embodiments of a gyro vibration piece, a method of manufacturing the gyro vibration piece, and a gyro sensor according to the present invention will be described with reference to the accompanying drawings.

First Embodiment

Figure 1A:
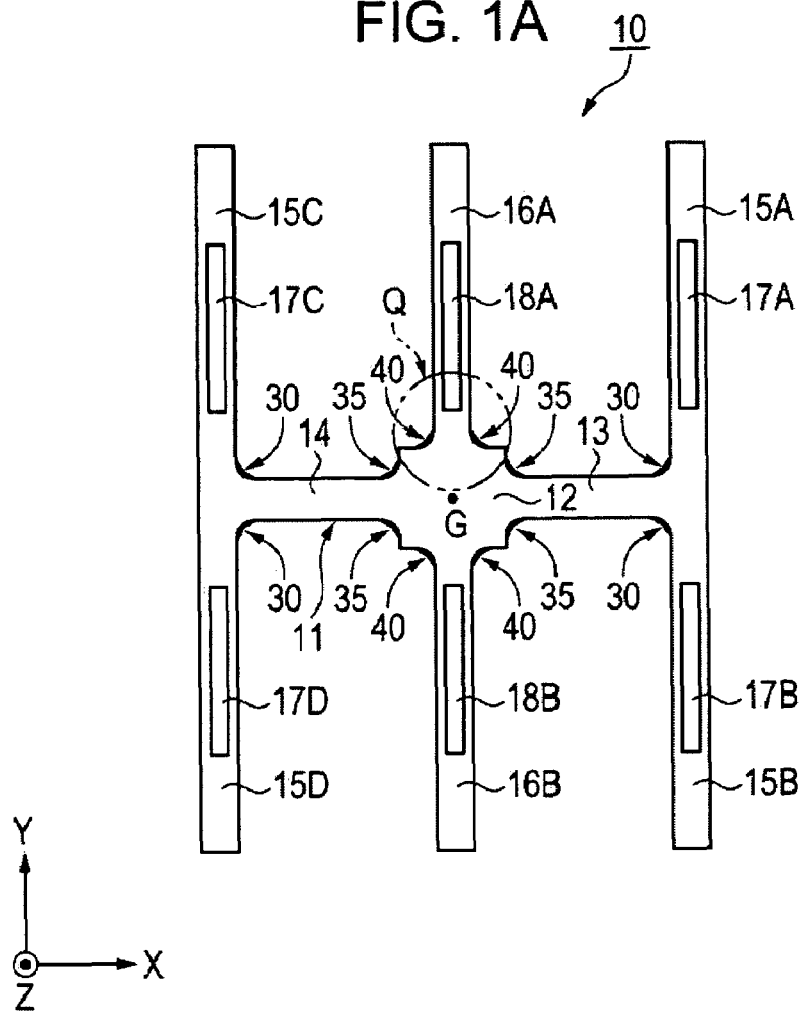
FIG. 1A is a plan view schematically illustrating the structure of a gyro vibration piece according to a first embodiment of the invention.
Figure 1B:
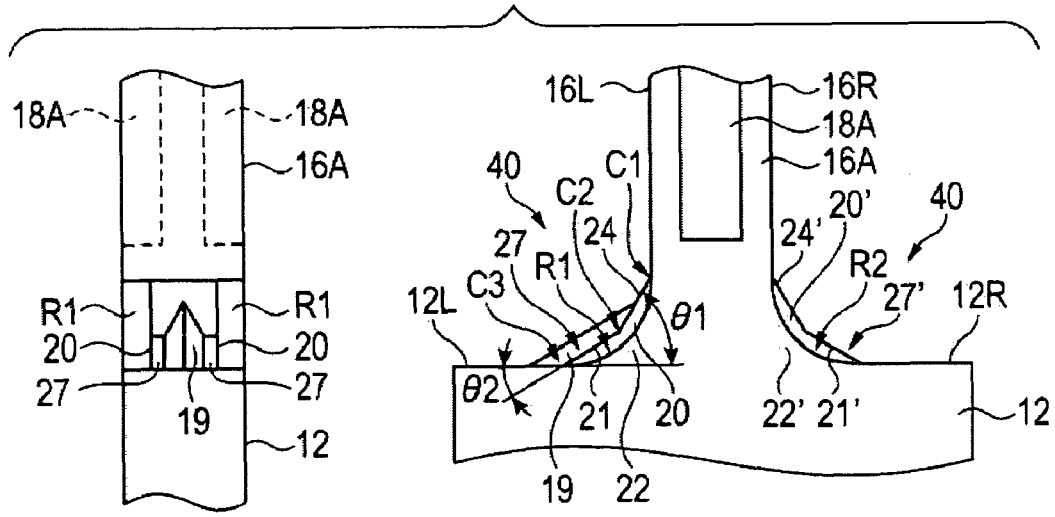
FIG. 1B is a partially enlarged view of Q shown in FIG. 1A and a left-side view thereof.

A gyro vibration piece according to a first embodiment of the present invention will be described with reference to the accompanying drawings. FIG. 1A is a plan view schematically illustrating a structure of a gyro vibration piece according to a first embodiment of the invention, and FIG. 1B is a partially expanded view of Q shown in FIG. 1A and a left-side view thereof.

In the first embodiment, a double T-type gyro vibration piece will be described as an example of the gyro vibration piece. As shown in FIG. 1A, the gyro vibration piece 10 is formed of a crystal substrate as an example of a piezoelectric substrate. Crystal forming the crystal substrate has an X-axis, which is called an electrical axis, a Y-axis, which is called a mechanical axis, and a Z-axis, which is called an optical axis. The gyro vibration piece 10 is formed in an X-Y plane of Z-cut crystal substrate that is cut in a direction of a plane formed by the X-axis and Y-axis of the crystal. The gyro vibration piece 10 is formed of a crystal substrate having a predetermined thickness. The plane of the gyro vibration piece 10 is formed in an X-Y plane along the crystalline axis of crystal, and is formed in point symmetry of 180° with respect to a central point G. The central point G indicates a central position of the gyro vibration piece 10.

The gyro vibration piece 10 includes a supporting part 11 at its central portion. The supporting part 11 consists of a base part 12 and two connection arms 13 and 14. The base part 12 has a rectangular shape having a section parallel to the X-axis and Y-axis. The base part 12 is connected to the connection arms 13 and 14 each extended from a central portion of two sections of the base part 12 parallel to the Y-axis of the base part 12 toward a direction parallel to the X-axis. In addition, the base part 12 is connected to detection parts extended from a central portion of two sections parallel to the X-axis of the base part 12 toward a direction parallel to the Y-axis, i.e., a detection arm 16A extended in a plus direction of Y-axis and a detection arm 16B extended in a minus direction of Y-axis. End portions of the connection arms 13 and 14 are connected to driving arms 15A, 15B, 15C, and 15D, which are extended in a diagonal direction of the connection arms 13 and 14. That is, the end portion of the connection arm 13 is connected to the driving arm 15A extended in a plus direction of Y-axis and to the driving arm 15B extended in a minus direction of Y-axis. In addition, the end portion of the connection arm 14 is connected to the driving arm 15C extended in a plus direction of Y-axis and to the driving arm 15D extended in a minus direction of Y-axis.

The driving arms 15A, 15B, 15C, and 15D have a width or length set so that driving vibration having a predetermined resonance frequency is generated. In addition, the driving arms 15A, 15B, 15C, and 15D have recesses 17A, 17B, 17C, and 17D on a central portion of each of the driving arms to improve vibration performance. The detection arms 16A and 16B and the connection arms 13 and 14 have a width or length set so that detection vibration having a predetermined resonance frequency is generated. In addition, the detection arms 16A and 16B have recesses 18A and 18B on a central portion of each of the detection arms to improve detection vibration performance.

Next, a connection portion 30 between the driving arms 15A, 15B, 15C, and 15D and the connection arms 13 and 14, a connection portion 40 between the detection arms 16A and 16B and the base part 12, and a second connection portion 35 between the connection arms 13 and 14 and the base part 12 will be described. The connection portions 30 and 40, and the second connection portion 35 have the same structure, and FIG. 1B is thus used as part of Q shown in FIG. 1A.

A connection on a left side of a plan view shown in FIG. 1B will be described. As shown in FIG. 1B, a side having a segment 16L of the detection arm 16A and a side having a segment 12L of the base part 12 are connected to each other at a connection part 22. A fin 19 having a projected shape is formed almost at a central portion of a side of the connection part 22 in the thickness direction. The fin 19 is formed by anisotropy of the etching process described in the Background. A third end portion 27 connected to the fin 19 is formed around the fin 19. The third end portion 27 has a wall portion in which the segment 16L of the detection arm 16A and the segment 12L of the base part 12 are continuously connected to each other by a segment 24 of about 60° (denoted by angle θ1) with respect to X-axis and a segment 21 of about 30° (denoted by angle θ2) with respect to X-axis. Points C1, C2, and C3 each having an angle of about 150° are formed on a connection portion between the segment 16L and the segment 24, a connection portion between the segment 24 and the segment 21, a connection portion between the segment 21 and the segment 12L, respectively. A wall portion of the third end portion 27 is connected to a first end portion or a second end portion 20 (The first end portion indicates the connection part 22 formed on the connection portions 30 and 40, and the second end portion indicates a second connection part (not shown) formed on the second connection portion 35. The first and second end portions have the same structure, and the first end portion 20 will thus be described and the second end portion will not be described). The third end portion 27 and the first end portion 20 are connected to each other such that the wall portion of the third end portion 27 and the bottom surface of the first end portion 20 are continuously connected to each other. The first end portion 20 has a circular arc shaped wall portion R1 that continuously connects the segment 16L and the segment 12L as tangent lines. In other words, the wall portion R1 is formed by a curved line in which the segments 16L and 12L do not have vertices. In addition, the wall portion R1 may be formed by connecting the segment 16L and the segment 12L without vertices, or, for example, by using a curved line (not shown) having irregular curvature between the segment 16L and the segment 12L. The wall portion R1 of the first end portion 20 is continuously connected to a surface of the connection part 22.

Next, a connection on a right side of a plan view shown in FIG. 1B will be described. A side having a segment 16R of the detection arm 16A and a side having a segment 12R of the base part 12 are connected to each other at a connection part 22'. A third end portion 27' is formed almost at a central portion of a side of the connection part 22' in the thickness direction. The third end portion 27' connects the segment 16R of the detection arm 16A to the segment 12R of the base part 12. The third end portion 27' has a wall portion formed of a segment 24' and a segment 21' which are formed in line symmetry to the segment 24 and the segment 21 of the third end portion 27. The segment 16R of the detection arm 16A and the segment 12R of the base part 12 are continuously connected to each other by the wall portion formed by the segments 24' and 21'. The wall portion of the third end portion 27' is connected to the first end portion 20' having a wall surface. The first end portion 20' has a circular arc shaped wall portion R2 that continuously connects the segment 16R and the segment 12R as tangent lines. In other words, the wall portion R2 is formed by a curved line in which the segments 16R and 12R do not have vertices. In addition, the wall portion R2 may be formed by connecting the segment 16R and the segment 12R without vertices, or, for example, by using a curved line (not shown) having irregular curvature between the segment 16R and the segment 12R. The wall portion R2 of a first end portion 20' is continuously connected to a surface of the connection part 22'. The fin 19 formed on the left side is not formed on the right side of the connection part 22'. The connection part 22' on the right side is formed almost in line symmetry to the connection part 22 with respect to a central line of the detection arm 16A in width direction, except the fin 19.

Figure 2:
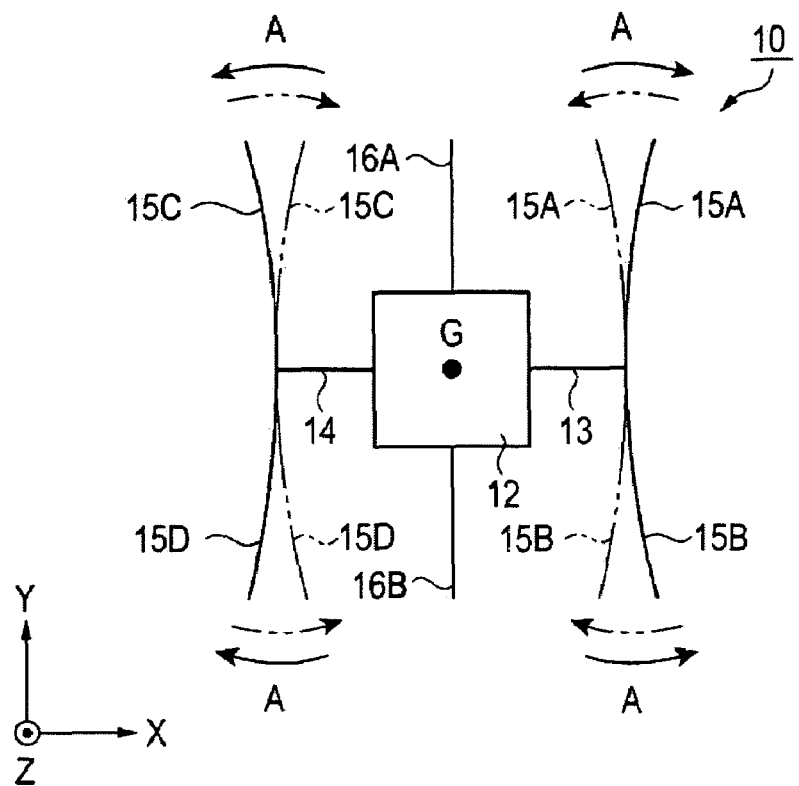
FIG. 2 is a plan view for explaining the driving vibration of a gyro vibration piece.
Figure 3:
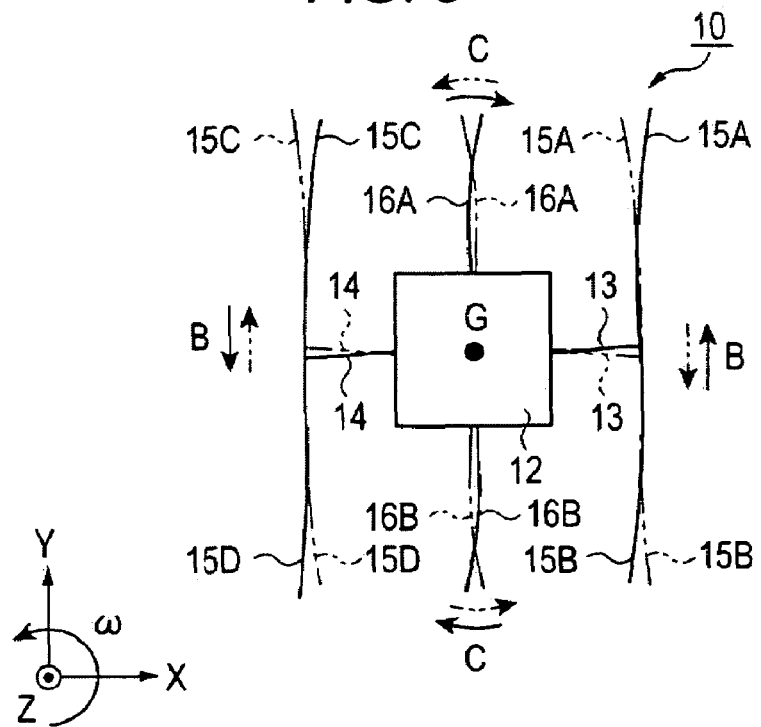
FIG. 3 is a plan view for explaining the detection vibration of a gyro vibration piece.

The vibrating operation of the gyro vibration piece 10 will be described. FIGS. 2 and 3 are plan views for explaining the operation of the gyro vibration piece 10 according to the first embodiment of the present invention. In FIGS. 2 and 3, each of vibration arms is simplified to a line to easily represent the vibrating shape. The same components as those of FIG. 1 are denoted by the same reference numerals, and a detailed description thereof will thus be omitted herein.

FIG. 2 is a view for explaining driving vibration. In FIG. 2, the driving vibration indicates that the driving arms 15A, 15B, 15C, and 15D vibrate in a direction of an arrow 'A' in a predetermined frequency in which vibration represented by a solid line and a dash-dot line is repeated. At this time, since the driving arms 15A and 15B and the driving arms 15C and 15D vibrate in line symmetry in Y-axis passing through the central point G, the base part 12, the connection arms 13 and 14, and the detection arms 16A and 16B seldom vibrate.

FIG. 3 is a view for explaining detection vibration. In FIG. 3, the detection vibration indicates that vibration represented by a solid line and a dash-dot line is repeated in the frequency of the driving vibration. The detection vibration is generated by Coriolis force applied in a direction of an arrow 'B' to the driving arms 15A and 15B, and 15C and 15D when angular velocity ω around Z-axis is applied to the gyro vibration piece 10 performing the driving vibration shown in FIG. 2.

As a result, the driving arms 15A, 15B, 15C, and 15D vibrate as shown in the arrow 'B'. The vibration represented by the arrow 'B' indicates vibration occurring in a circumferential direction with respect to the central point G. Simultaneously, as shown in the arrow 'C', the detection arms 16A and 16B vibrate in a direction opposite to the arrow 'B' in the circumferential direction in response to the vibration of the arrow 'B'.

At this time, a fringe of the base part 12 does not vibrate when the driving arms 15A, 15B, 15C and 15D and the detection arms 16A and 16B vibrate as shown in FIG. 2. Accordingly, even though a supporting member for supporting the gyro vibration piece 10 is fixed to the base part 12, it will not affect the vibration of the gyro vibration piece 10.

The gyro vibration piece 10 according to the first embodiment has the first end portions 20 and 20' having circular arc shaped wall portions R1 and R2 on the innermost side of the connection parts 22, 22' of the connection portion 40 between the detection arm 16A and the base part 12. Due to the first end portions 20 and 20', the wall portions R1 and R2 continuously connected to the surface of the detection arm 16A are roughly formed in a circular arc shape without vertices. Accordingly, stress concentration due to external impact seldom occurs, thereby preventing breakdown due to the stress concentration.

Also, the first end portions 20 and 20' have bottom surfaces, and the third end portions 27 and 27' are formed on a central side in a thickness direction than the bottom surface. The third end portions 27 and 27' have wall portions formed of segments 21 and 21' and segments 24 and 24' on an outer side than the wall portions R1 and R2 of the first end portions 20 and 20'. Accordingly, it is possible to increase a sectional area in the vicinity of a central portion in the thickness direction. That is, it is possible to improve the intensity of the connection parts 22 and 22' by increasing the volume of the connection parts 22 and 22'.

Also, other connection parts of the gyro vibration piece 10, for example, the connection portion 30 between the driving arms 15A, 15B, 15C, and 15D and the connection arms 13 and 14, and the second connection portion 35 between the connection arms 13 and 14 and the base part 12, have the same structure and same effect. As a result, it is possible to prevent breakdown of the driving arms 15A, 15B, 15C, and 15D, the connection arms 13 and 14, and the detection arms 16A and 16B due to impact such as dropping, and to provide a gyro vibration piece having an improved impact resistance.

Figure 4:
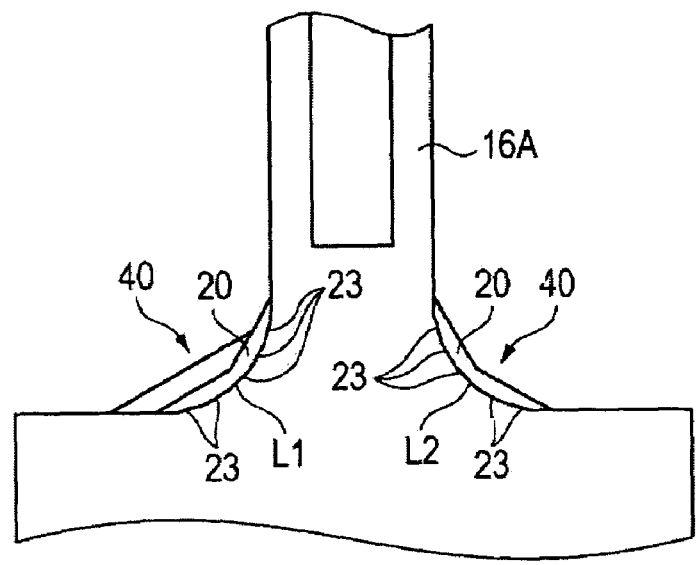
FIG. 4 is a plan view showing an example of a connected shape.

Also, as shown in FIG. 4, the first end portion 20 in the connection portion 40 between a side of the detection arm 16A and a side of the base part 12 may have circular arc shaped wall portions L1 and L2 formed by connecting a plurality of short lines 23. As a result, since the wall portions L1 and L2 have a plurality of intersecting points, stress concentration seldom occurs such that the detection arm 16A is seldom broken.

Figure 5:
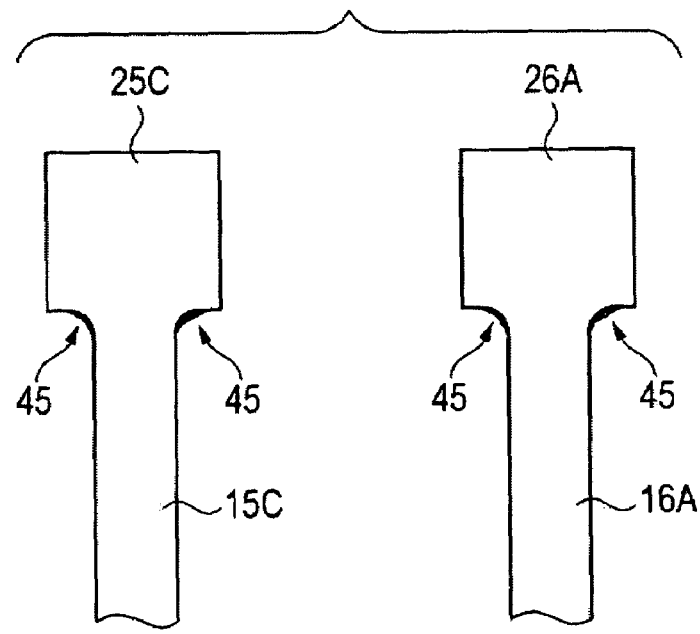
FIG. 5 is a plan view showing an example of applying a connected shape to another connection part.

Also, the structure of the connection parts 22 and 22' can be applied in addition to the connection portions 30 and 40, and the second connection portion 35 shown in FIG. 1. For example, as shown in FIG. 5, the structure of the connection parts 22 and 22' can be applied to a connection portion 45 in which weight-shaped members 25C and 26A formed on the end portions of the driving arm 15C and the detection arm 16A are formed. The connection portion 45 has the same effect as that of the first embodiment.

While the double T-type gyro vibration piece has been described in the above-mentioned embodiment, the present invention is not limited thereto. For example, the present invention can be applied to a tuning fork type gyro vibration piece or an H-type gyro vibration piece.

Second Embodiment

Figure 6:
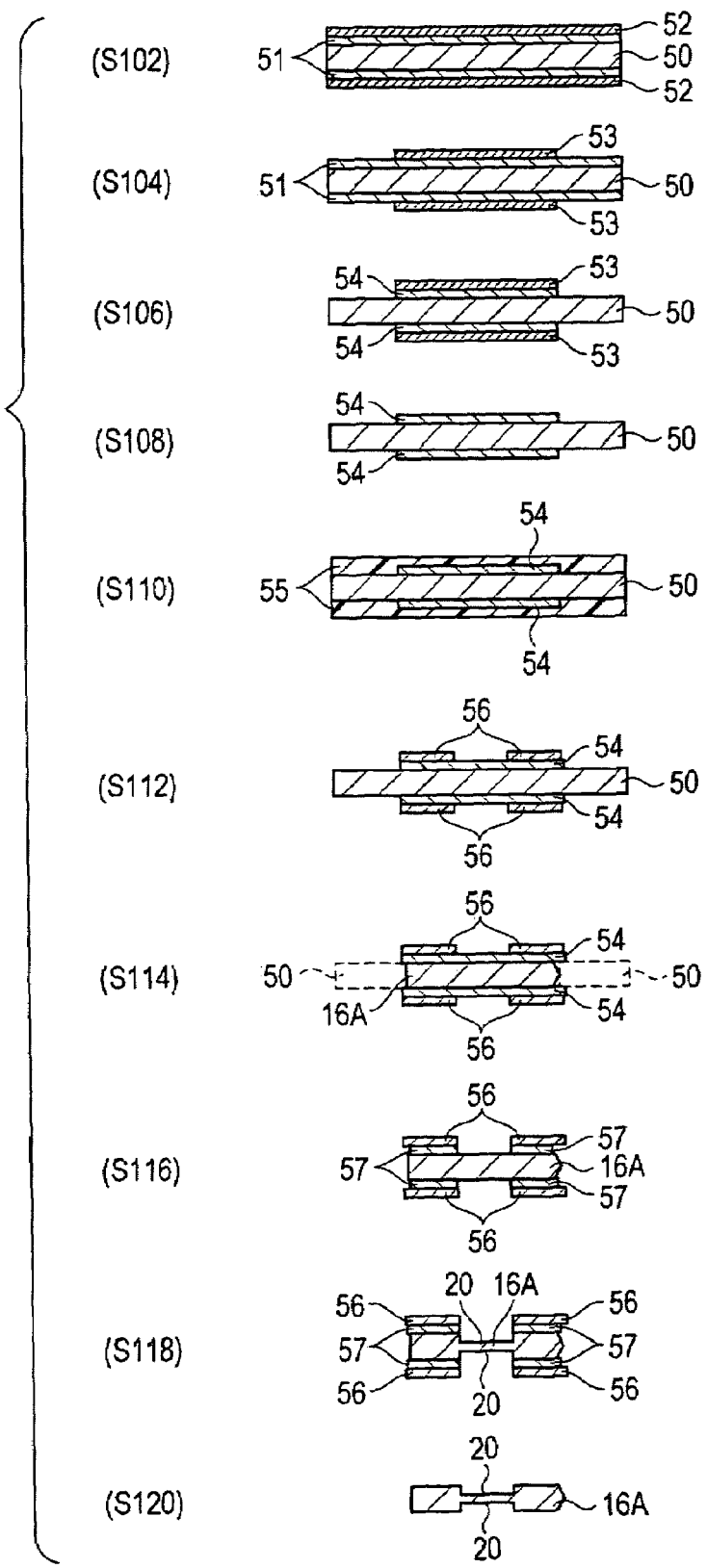
FIG. 6 is a process flow showing a method of manufacturing a gyro vibration piece according to a second embodiment of the invention.

A method of manufacturing a gyro vibration piece according to the present invention will be described with reference to the drawings. FIG. 6 is a process flow of a method of manufacturing a gyro vibration piece. In the second embodiment, a method of forming a gyro vibration piece using a crystal substrate as a piezoelectric substrate will be described.

A metal layer 51 is formed as a corrosion-resisting film on a surface of a crystal substrate 50. The metal layer 51 is formed of, for example, a chrome (Cr) layer as a base metal, and an aurum (Au) layer as a corrosion-resisting metal formed on the Cr layer. The Cr layer has a thickness of tens of nanometers and the Au layer has a thickness of hundreds of nanometers. The Cr layer having good adherence to the crystal substrate 50 and the Au layer is formed as a base metal layer since the crystal layer 50 has bad adherence to the Au layer. Also, in FIG. 6, the Cr layer and the Au layer are not depicted and a combination of the Cr layer and Au layer is depicted as the metal layer 51. A positive-type photoresist layer 52 is formed on the metal layer 51 (S102).

Next, a pattern for forming a first outer shape of the gyro vibration piece is subjected to photo-finishing by exposure of ultraviolet ray or the like. Subsequently, the pattern is subjected to a development process, and a mask 53 corresponding to the outer shape of the gyro vibration piece is formed by removing an unnecessary portion of the photoresist layer 52 (S104). Next, a metal layer 54 corresponding to the first outer shape is formed by performing an etching process on an exposed portion of the metal layer 51 (S106). Next, the mask 53 is removed, such that the metal layer 54 is exposed as a first mask having the first outer shape on the surface of the crystal substrate 50 (S108).

Next, a positive-type photoresist layer 55 is formed on the exposed surface of the crystal substrate 50 and the metal layer 54 to form a second outer shape pattern (S110). The pattern for the second outer shape is subjected to photo-finishing on the photoresist layer 55 by the exposure of ultraviolet ray or the like. Subsequently, the pattern is subjected to a development process, and a mask 56 corresponding to the second outer shape is formed by removing an unnecessary part of the photoresist layer 55 (S112).

Next, the crystal substrate 50, in which the metal layer 54 is used as a mask, is soaked in etching solution using hydrogen fluoride or ammonium fluoride, such that the crystal substrate 50 is subjected to a first etching process. An unnecessary part (depicted in a dashed line) of the crystal substrate 50 is removed by the etching process, such that the first outer shape, such as the detection arm 16A, is formed (S114). A main outer shape of the gyro vibration piece is formed by forming the first outer shape.

Next, in order to form a second outer shape, the metal layer 54 is etched while the mask 56 is used as a mask, such that a metal mask 57 is formed as a second mask (S116). By this etching process, the metal layer 54 on an area corresponding to a processing portion in the first outer shape is removed, thereby forming the metal mask 57. Next, the crystal substrate 50, in which the metal mask 57 is used as a mask, is soaked in etching solution using hydrogen fluoride or ammonium fluoride, such that the crystal substrate 50 is subjected to a second etching process. By this etching process, a second outer shape is formed by performing an additional process on the first outer shape (S118). The second outer shape is formed by, for example, additionally processing a first end portion 20 that has a circular wall surface and a bottom surface of a predetermined depth connected to the surface of the detection arm 16A shown in FIG. 1 and the recess 18A of the detection arm 16A. The second etching process is performed for a shorter time than the processing time of the first etching process. The etching process is performed for a short time, and thus the shape having the bottom surface can be processed in the middle of the depthwise direction.

Next, the mask 56 is removed and the metal mask 57 is removed (S120). By this process, the shape of the gyro vibration piece is formed.

According to the method of manufacturing the gyro vibration piece of the second embodiment, the first end portion 20 is formed by performing the second etching process (S118) on the inner side of the wall portion formed on the innermost side of the connection portion formed by the first etching process (S114). The first end portion 20 has a circular arc shaped wall portion on the inner side of the wall portion formed on the innermost side of the connection portion formed with the process of forming the first outer shape (for example, detection arm 16A). Thus, since the wall portion having vertices formed by the first etching process (S114) is removed, stress concentration due to external impact seldom occurs. Accordingly, for example, it is possible to prevent breakdown of the detection arm 16A.

Also, since the second etching process (S118) is performed in a shorter time than the first etching process (S114), the removed amount is small and an uneven shape is seldom generated. Thus, the first end portion 20 formed by the second etching process (S118) does not have uneven shape very much, such that the connection part has a stable shape. Accordingly, it is possible to prevent problems generated due to the uneven shape of the connection part. For example, it is possible to prevent the vibration of the vibration part from leaking to the outside such as the detection part, or to reliably detect the angular velocity.

Third Embodiment

Figure 7:
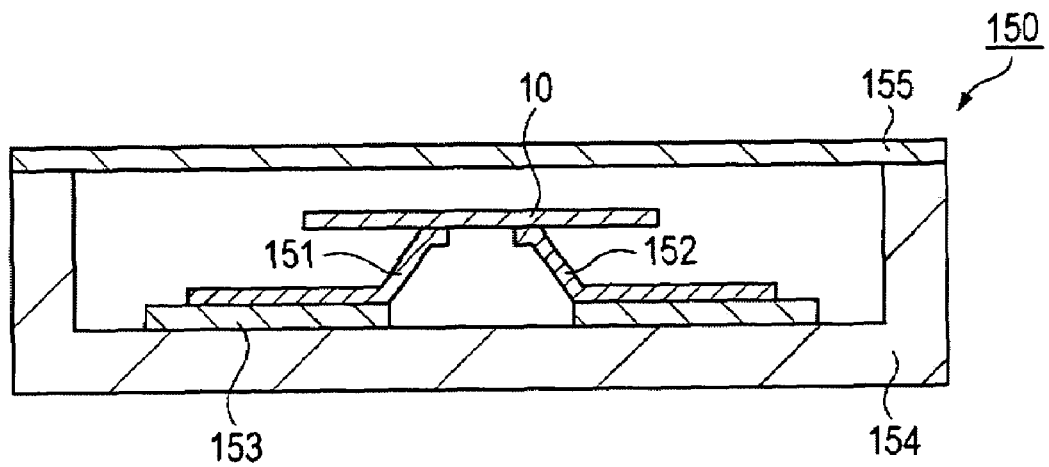
FIG. 7 is a front cross-sectional view showing the structure of a gyro sensor according to a third embodiment of the invention.

A gyro sensor according to a third embodiment will be described with reference to FIG. 7. FIG. 7 is a front cross-sectional view of the structure of the gyro sensor according to the third embodiment.

As shown in FIG. 7, the gyro sensor 150 according to the present invention includes a gyro vibration piece 10, supporting arms 151 and 152 of the gyro vibration piece 10 located within a package 154 serving as a holding unit, a supporting substrate 153, and a cover 155 of the package 154.

The package 154 is formed of, for example, a ceramic. The supporting substrate 153, on which a circuit pattern and the like is formed, is fixed on a hollow formed on a central portion of the package 154. An end portion of each of the supporting arms 151 and 152 is connected to a surface of the supporting substrate 153. The supporting arms 151 and 152 are formed of a flexible metal thin film. The gyro vibration piece 10 is connected to an end portion located on an opposite side of an end portion connected to the supporting substrate 153. The supporting arms 151 and 152 are formed to be bent upward on a portion projected from the supporting substrate 153 in order to prevent contact between the supporting substrate 153 and the gyro vibration piece 10. The supporting arms 151 and 152 are further bent in the vicinity of the end portion in the bent direction, in which the gyro vibration piece 10 is connected. The gyro vibration piece 10 described in the first embodiment is used. The opening of the package 154 is covered with the cover 155 which is fixed, for example, by seam welding, metal heat fusion, or the like. The cover 155 is fixed while the hollow of the package 154 is in a vacuum state. The hollow of the package 154 is sealed in a vacuum state by fixing the cover 155.

In the gyro sensor 150 according to the third embodiment, the gyro vibration piece 10 described in the first embodiment is mounted in the package 154 and is sealed in a vacuum state. Accordingly, it has the same effect as the gyro vibration piece 10 described in the first embodiment. Also, since the gyro vibration piece 10 is supported in the vacuum state, it is possible to reduce the effect of temperature of components other than the package 154 and to provide a gyro sensor having stable vibration performance.

Fourth Embodiment

Figure 8:
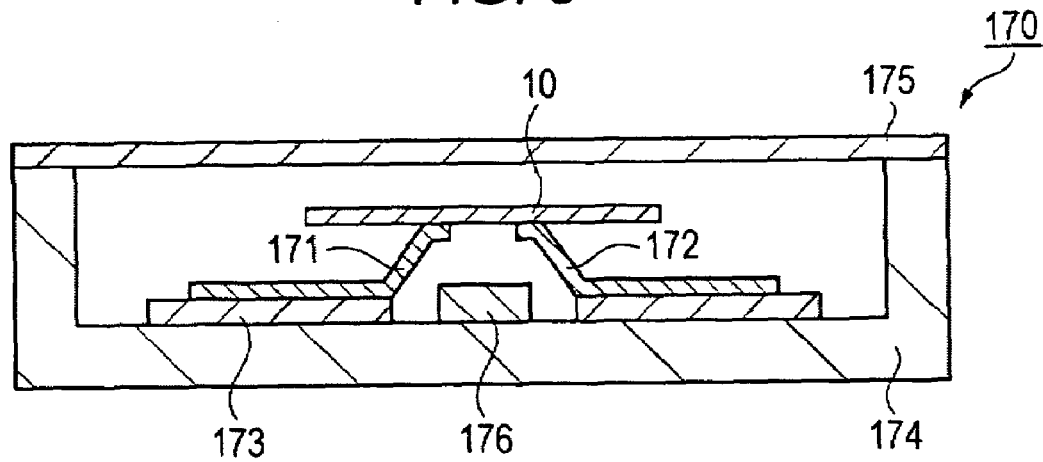
FIG. 8 is a front cross-sectional view showing the structure of a gyro sensor according to a fourth embodiment of the invention.

A fourth embodiment will be described with reference to FIG. 8. FIG. 8 is a front cross-sectional view of the structure of a gyro sensor according to the fourth embodiment of the present invention.

As shown in FIG. 8, a gyro sensor 170 according to the present invention includes a plurality of components in a package 174. The components in the package 174 are a gyro vibration piece 10, supporting arms 171 and 172 of the gyro vibration piece 10, a supporting substrate 173, and a circuit element 176. An opening of the package 174 is sealed with a cover 175.

The package 174 is formed of, for example, a ceramic. The supporting substrate 173, on which a circuit pattern and the like is formed, is fixed to a hollow formed on a central portion of the package 174. An end portion of each of the supporting arms 171 and 172 is connected to the surface of the supporting substrate 173. The supporting arms 171 and 172 are formed of a flexible metal thin film or the like. The gyro vibration piece 10 is connected to an end portion located on an opposite side of an end portion connected with the supporting substrate 173. The supporting arms 171 and 172 are formed to be bent upward on a portion projected from the supporting substrate 173 in order to prevent contact between the supporting substrate 173 and the gyro vibration piece 10. The supporting arms 171 and 172 are further bent in the vicinity of the end portion in the bent direction, in which the gyro vibration piece 10 is connected. The gyro vibration piece 10 described in the first embodiment is used. The circuit element 176 is fixed with a conductive adhesive (not shown) on a bottom surface of the hollow of the package 174. The circuit element 176 is electrically connected to a connection wire (not shown) formed on the package 174 or the supporting substrate 173 by wire-bonding or the like. The circuit element 176 has various functions such as a function of driving the gyro vibration piece 10, or a function of detecting angular velocity. The opening of the package 174 is covered with the cover 175 which is fixed, for example, by seam welding, metal heat fusion, or the like. The cover 175 is fixed while the hollow of the package 174 is in a vacuum state. The hollow of the package 174 is sealed in a vacuum state by fixing the cover 175.

According to the fourth embodiment, the gyro vibration piece 10 is mounted in the package 174 in a vacuum state. Accordingly, it has the same effect as the gyro vibration piece 10 described in the first embodiment. In addition, since all components such as the circuit element 176 and the like are provided in the package 174, an external attaching component is not necessary. In addition, since the gyro vibration piece 10 is supported in a vacuum state, it is possible to reduce the effect of temperature of components other than the package 174 and to provide a gyro sensor having stable vibration performance.

Also, the method of fixing the package and the cover described in the third and fourth embodiments may be performed using other fixing material such as low melting point glass or thermal curing type adhesive.

Also, even though a double T-type gyro vibration piece has been described as an example of a gyro vibration piece in the above-mentioned embodiments, the present invention does not limited thereto. For example, the present invention can be applied to an electrode of a gyro vibration piece such as a tuning fork type gyro vibration piece or an H-type gyro vibration piece.

The entire disclosure of Japanese Patent Application No. 2005-97590, filed Mar. 30, 2005 is expressly incorporated by reference herein.

What is claimed is:

1. A gyro vibration piece detecting an angular velocity comprising:
    a supporting part;
    a driving part connected to the supporting part and performing vibration;
    a detection part connected through the driving part and the supporting part and detecting detection vibration generated by Coriolis force generated by the rotation of the driving part; and
    a connection part including a connection portion having a fin and an end portion continuously connected between at least one of a side of the driving part and a side of the supporting part and a side of the detection part and a side of the supporting part, the end portion including a top surface and a side surface, the side surface of the end portion being substantially perpendicular to the top surface of the end portion and including a circular arc shape disposed along a bottom portion thereof opposite to a junction of the top surface of the end portion and the side surface of the end portion.

2. The gyro vibration piece according to claim 1, wherein the supporting part includes a base part and a supporting member extended from the base part, the driving part is connected to the supporting member, and the detection part is extended from the base part.

3. The gyro vibration piece according to claim 2, further comprising a second connection part having a second connection portion formed between a side of the base part and a side of the supporting member, which are continuously connected,
    wherein the second connection part has a second end portion which is located on an inner side of the second connection part among the second connection portion and has a circular arc shaped wall portion that connects a side of the base part to a side of the supporting member and a bottom surface having a predetermined depth.

4. A gyro sensor comprising:
    a holding unit;
    a gyro vibration piece according to claim 1 that is mounted in the holding unit; and
    a circuit element mounted in the holding unit and having at least a function of driving the gyro vibration piece.

* * * * *